United States Patent
Hanaki et al.

(10) Patent No.: US 8,412,219 B2
(45) Date of Patent: Apr. 2, 2013

(54) BASE STATION, UPPER NODE, RADIO COMMUNICATION SYSTEM AND RADIO COMMUNICATION METHOD

(75) Inventors: Akihito Hanaki, Yokohama (JP); Hidehiko Oyane, Yokohama (JP); Akihiro Fujiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 15 days.

(21) Appl. No.: 13/059,811

(22) PCT Filed: Aug. 19, 2009

(86) PCT No.: PCT/JP2009/064502
§ 371 (c)(1),
(2), (4) Date: May 10, 2011

(87) PCT Pub. No.: WO2010/021338
PCT Pub. Date: Feb. 25, 2010

(65) Prior Publication Data
US 2011/0207467 A1  Aug. 25, 2011

(30) Foreign Application Priority Data
Aug. 19, 2008 (JP) ................. 2008-210916

(51) Int. Cl.
*H04W 72/00* (2009.01)

(52) U.S. Cl. .............. 455/450; 455/561; 370/329

(58) Field of Classification Search .......... 455/450–453, 455/561; 370/329–330
See application file for complete search history.

(56) References Cited

U.S. PATENT DOCUMENTS

| | | | | |
|---|---|---|---|---|
| 2002/0077113 | A1* | 6/2002 | Spaling et al. | 455/453 |
| 2004/0009776 | A1 | 1/2004 | Ishikawa et al. | |
| 2004/0041937 | A1 | 3/2004 | Oshima | |
| 2006/0252429 | A1* | 11/2006 | Chen et al. | 455/450 |
| 2007/0265017 | A1 | 11/2007 | Ishii et al. | |

FOREIGN PATENT DOCUMENTS

| | | |
|---|---|---|
| JP | 2004 15342 | 1/2004 |
| JP | 2007 159054 | 6/2007 |
| JP | 2007 181196 | 7/2007 |
| JP | 2008 104168 | 5/2008 |

OTHER PUBLICATIONS

3GPP TS 25.321 V7.5.0, "3rd Generation Partnership Project; Technical Specification Group Radio Access Network; Medium Access Control (MAC) protocol specification (Release 7)," 3GPP™, pp. 2-141, (Jun. 2007).
3GPP TS 25.212 V7.5.0, "3rd Generation Partnership Project; Technical Specification Group Radio Access Network; Multiplexing and channel coding (FDD) (Release 7)," 3GPP™, pp. 2-103, (May 2007).
International Search Report issued Nov. 17, 2009 in PCT/JP09/064502 filed Aug. 19, 2009.

* cited by examiner

*Primary Examiner* — Vladimir Magloire
(74) *Attorney, Agent, or Firm* — Oblon, Spivak, McClelland, Maier & Neustadt, L.L.P.

(57) ABSTRACT

A base station includes a scheduling unit and a call reception control unit. The call reception control unit includes a managing unit that updates total resource usage amount based on total resource allocation amount and manages the total resource usage amount, and a decision unit that adds an initial radio resource to be allocated to a new call to the total resource usage amount and decides whether the new call can be accepted. The managing unit updates the total resource usage amount by subtracting a radio resource in response to the release of an existing call that radio resource allocation being not controlled at each transmission time interval. The managing unit manages the total resource usage amount without subtracting a radio resource in response to the release of an existing call that radio resource allocation being controlled at each transmission time interval.

6 Claims, 7 Drawing Sheets

BASE STATION, UPPER NODE, RADIO COMMUNICATION SYSTEM AND RADIO COMMUNICATION METHOD

BACKGROUND OF THE INVENTION

1. Field of the Invention

The present invention relates to a base station, an upper node, a radio communication system and a radio communication method for allocating radio resource to uplink data.

2. Description of the Related Art

Heretofore, a radio communication system including base stations and radio network controllers has been known. The base station has one or multiple cells which each perform radio communication with a radio terminal. The radio network controller manages multiple base stations and allocates radio resource to radio terminals. Note that such a technique (referred to below as first technique) is sometimes called R99 (Release 99).

Recently, for improved throughput, shorter delay time and the like, a technique has been proposed in which a base station (network side) performs operations such as allocation of radio resource to uplink data transmitted from a radio terminal to the base station. Note that such a technique (referred to below as second technique) is sometimes called HSUPA (high speed uplink packet access) or EUL (enhanced uplink).

Each cell functions as a serving cell or a non-serving cell depending on the case. A transmission rate of uplink data (such as a TBS (transport block size) determined according to an SG (scheduling grant)) is controlled by using transmission rate control data transmitted from a serving cell and a non-serving cell. Transmission rate control data includes absolute transmission rate control data (AG; absolute grant) for directly specifying the transmission rate and relative transmission rate control data (RG; relative grant) for relatively specifying the transmission rate (see 3GPP TS25. 321 Ver. 7.5.0, for example).

Here, uplink data is transmitted from the radio terminal to the base station through an enhanced dedicated physical data channel (E-DPDCH). Absolute transmission rate control data (AG) is transmitted from the base station to the radio terminal through an absolute transmission rate control channel (E-AGCH; E-DCH absolute grant channel). Relative transmission rate control data (RG) is transmitted from the base station to the radio terminal through a relative transmission rate control channel (E-RGCH; E-DCH relative grant channel).

A serving cell transmits absolute transmission rate control data (AG) and relative transmission rate control data (RG) to a radio terminal. Meanwhile, a non-serving cell transmits only relative transmission rate control data (RG) to a radio terminal, and does not transmit absolute transmission rata control data (AG).

The above-mentioned base station according to the second technique includes a call reception control unit configured to control whether or not to receive a new call, and a scheduling unit configured to control radio resource (transmission rate) to be allocated to uplink data. The scheduling unit transmits absolute transmission rate control data (AG) or relative transmission rate control data (RG). There are two types of transmission time interval (TTI) for uplink data different in the length of 1 TTI, which are 2 msec TTI and 10 msec TTI. In the case of 2 msec TTI, the scheduling unit can transmit absolute transmission rate control data (AG) or relative transmission rate control data (RG) at each TTI.

Here, the call reception control unit controls whether or not to receive a new call depending on the radio resource (transmission rate) allocated to the radio terminal. For this reason, the call reception control unit needs to acquire a radio resource allocation state from the scheduling unit. For example, the call reception control unit may make an inquiry about the radio resource allocation state to the scheduling unit, in response to a new call-establishment request.

However, making the inquiry about the radio resource allocation state lowers the speed of processing for receiving new calls. On the other hand, without making the inquiry about the radio resource allocation state, the call reception control unit cannot know the radio resource allocation state in real-time, and hence cannot appropriately control reception of new calls.

Furthermore, calls based on 2 msec TTI include a call for which the scheduling unit controls radio resource allocation at each TTI. If the scheduling unit controls radio resource allocation at each TTI, the call reception control unit cannot know the radio resource allocation state in real-time and thus cannot appropriately control reception of new calls.

SUMMARY OF THE INVENTION

A base station according to a first aspect includes: a scheduling unit configured to allocate radio resource to be used for reception of uplink data; and a call reception control unit configured to control reception of a call. The scheduling unit includes a reporting unit configured to report a total resource allocation amount of radio resource to the call reception control unit at predetermined intervals, the radio resource being allocated by the scheduling unit. The call reception control unit includes a management unit configured to manage a total resource usage amount of radio resource used for reception of uplink data by updating the total resource usage amount of radio resource used for reception of uplink data on the basis of the total resource allocation amount reported by the scheduling unit, and a determination unit configured to determine whether or not reception of a new call is permissible by adding initial radio resource to be allocated to the new call to the total resource usage amount managed by the management unit. In response to release of an existing call for which the scheduling unit does not control radio resource allocation at each transmission time interval, the management unit updates the total resource usage amount by subtracting radio resource allocated to the existing call for which the scheduling unit does not control the radio resource allocation at each transmission time interval. In response to release of an existing call for which the scheduling unit controls radio resource allocation at each transmission time interval, the management unit manages the total resource usage amount without subtracting radio resource allocated to the existing call for which the scheduling unit controls the radio resource allocation at each transmission time interval.

DESCRIPTION OF THE PREFERRED EMBODIMENTS

Hereinafter, a radio communication system according to embodiments of the present invention will be described with reference to the drawings. Note that same or similar reference signs denote same or similar portions in the following description of the drawings.

Note, however, that the drawings are schematic and ratios of dimensions and the like are different from actual ones. Therefore, specific dimensions and the like should be determined in consideration of the following description. Moreover, it goes without saying that the drawings also include portions having different dimensional relationships and ratios from each other.

[Outline of Embodiment]

Hereinafter, a simple description will be given of an outline of an embodiment. A base station according to the embodiment includes a scheduling unit configured to allocate radio resource used for reception of uplink data, and a call reception control unit configured to control reception of calls. The scheduling unit and the call reception control unit operate independently.

The scheduling unit reports a total resource allocation amount to the call reception control unit at predetermined intervals. The call reception control unit manages a total resource usage amount by updating the total resource usage amount on the basis of the total resource allocation amount reported by the scheduling unit. The call reception control unit determines whether or not reception of a new call is permissible by adding radio resource to be allocated to the new call (initial radio resource) to the total resource usage amount. In response to a release of a first existing call, the call reception control unit updates the total resource usage amount by subtracting the radio resource allocated to the existing call. Specifically, the first existing call is a call for which the scheduling unit does not control radio resource allocation at each TTI. On the other hand, even when a second existing call is released, the call reception control unit manages the total resource usage amount without subtracting the radio resource allocated to the existing call. Specifically, the second existing call is a call for which the scheduling unit controls radio resource allocation at each TTI.

This configuration allows the call reception control unit to appropriately manage the total resource usage amount. Accordingly, the call reception control unit can appropriately and promptly control reception of new calls.

[First Embodiment]

(Configuration of Radio Communication System)

Figure 1:
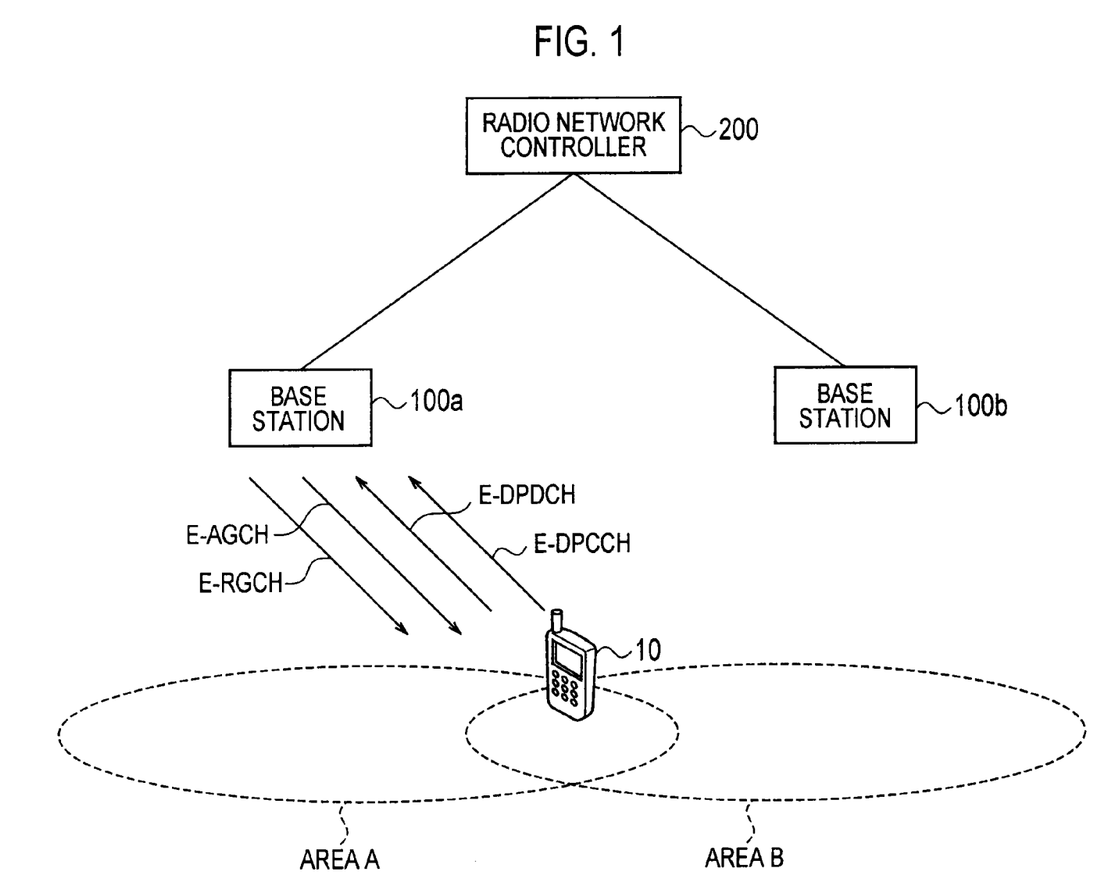
FIG. 1 is a diagram showing a radio communication system according to a first embodiment.

Hereinafter, a configuration of a radio communication system according to a first embodiment of the present invention will be described with reference to the drawings. FIG. 1 is a diagram showing the radio communication system according to the first embodiment.

As shown in FIG. 1, the radio communication system includes a radio terminal 10, base stations 100 (base station 100a and base station 100b) and a radio network controller 200. Note that FIG. 1 shows a case where the radio terminal 10 communicates with the base station 100a.

The radio terminal 10 transmits uplink data to the base station 100a. Specifically, in a scheme in which the radio network controller 200 performs allocation of radio resource and the like, the radio terminal 10 transmits uplink data to the base station 100a through a dedicated physical data channel (DPDCH). Note that the scheme in which the radio network controller 200 performs allocation of radio resource and the like is sometimes called R99 (Release 99).

In the scheme in which the radio network controller 200 performs allocation of radio resource and the like, the radio terminal 10 transmits uplink control data to the base station 100a through a dedicated physical control channel (DPCCH).

Note that the transmission power of a DPCCH is controlled by a TPC command received from the base station 100 as in the case of general closed-loop power control. A TPC command is a command that the base station 100 generates by comparing a reception quality of an uplink signal and a target quality.

Meanwhile, in a scheme in which the base station 100 performs allocation of radio resource and the like, the radio terminal 10 transmits uplink data to the base station 100a through an enhanced dedicated physical data channel (E-DPDCH). Note that the scheme in which the base station 100 performs allocation of radio resource and the like is sometimes called HSUPA (high speed uplink packet access) or EUL (enhanced uplink).

Here, uplink data is divided into blocks in units of TTIs (transmission time intervals), i.e., units of processes (HARQ processes). Each block is transmitted by a process (referred to below as an active process) allocated to the radio terminal 10.

A predetermined number of processes (process #1 to process #n) form a cycle (HARQ RTT), and the processes are repeatedly used on a cycle basis. Note that the number of processes in a cycle is determined according to the length of the TTI. For example, if the TTI length is 2 ms, the number of processes in a cycle is "8." If the TTI length is 10 ms, the number of processes in a cycle is "4."

Here, the radio terminal 10 has a table related to uplink data transmitted through an E-DPDCH, the table associating transmission power ratios and transmission rates. A transmission power ratio is a ratio between a transmission power of an E-DPDCH and a transmission power of a DPCCH (E-DPDCH/DPCCH). A transmission rate is indicated by a TBS (transport block size).

In the following description, a transmission power ratio assigned to the radio terminal 10 is referred to as an SG (scheduling grant). Incidentally, since a transmission power ratio and a transmission rate are associated with each other on a one-to-one basis, an SG (scheduling grant) may be regarded not only as a term indicating a transmission power ratio assigned to the radio terminal 10 but also as a term indicating a transmission rate assigned to the radio terminal 10. It should be noted that in the first embodiment, a transmission rate assigned to the radio terminal 10 is an example of radio resource.

Note that as will be mentioned below, the radio terminal 10 updates the SG according to transmission rate control data (later-mentioned AG or RG) received from the base station 100a (refer to 3GPP TS25. 321 Ver. 7.5.0 11.8.1.3 "Serving Grant Update"). Thereafter, the radio terminal 10 refers to the table associating transmission power ratios and transmission rates to determine a transmission rate (i.e., a TBS) associated to the SG (refer to 3GPP TS25. 321 Ver. 7.5.0 11.8.1.4 "E-TFC Selection").

In the scheme in which the base station 100 performs allocation of radio resource and the like, the radio terminal 10 transmits uplink control data to the base station 100a through an enhanced dedicated physical control channel (E-DPCCH) or an E-DPDCH. Uplink control data includes scheduling information (UL scheduling information) which the base station 100a references in allocating radio resource.

Scheduling information includes an "HLID (highest priority logical channel ID)," a "TEBS (total E-DCH buffer status)," an "HLBS (highest priority logical channel buffer status)," a "UPH (user power headroom)" and the like. Examples of uplink control data other than the scheduling information include a "happy bit," a "CQI" and the like (refer to 3GPP TS25. 321 Ver. 7.5.0 9.2.5.3 "UL Scheduling Information").

An "HLID" is an identifier for identifying a logical channel having the highest priority among logical channels transmitting uplink data.

A "TEBS" is information indicating the amount of uplink data (buffer amount) stored in a transmission buffer provided to the radio terminal 10.

An "HLBS" is the amount of uplink data (buffer amount) corresponding to the logical channel identified by the HLID, among the uplink data stored in the transmission buffer provided to the radio terminal 10.

A "UPH" is a transmission power ratio which is a ratio of a transmission power of a DPCCH to the maximum transmission power (maximum UE transmission power). The maximum transmission power is the maximum allowable transmission power of the radio terminal 10. For example, a UPH is expressed as "maximum transmission power"/"transmission power of DPCCH."

A "happy bit" is information indicating the degree of happiness, which shows whether or not an SG allocated to the radio terminal 10 is sufficient. There are two types of "happy bits" including "happy" which indicates that the SG allocated to the terminal is sufficient and "unhappy" which indicates that the SG allocated to the terminal is insufficient. Note that a "happy bit" is indicated by a single bit.

A "CQI" is a reception quality value indicating a reception quality of a downlink signal (such as a CPICH; common pilot channel) that the radio terminal 10 receives from the base station 100.

Figure 2:
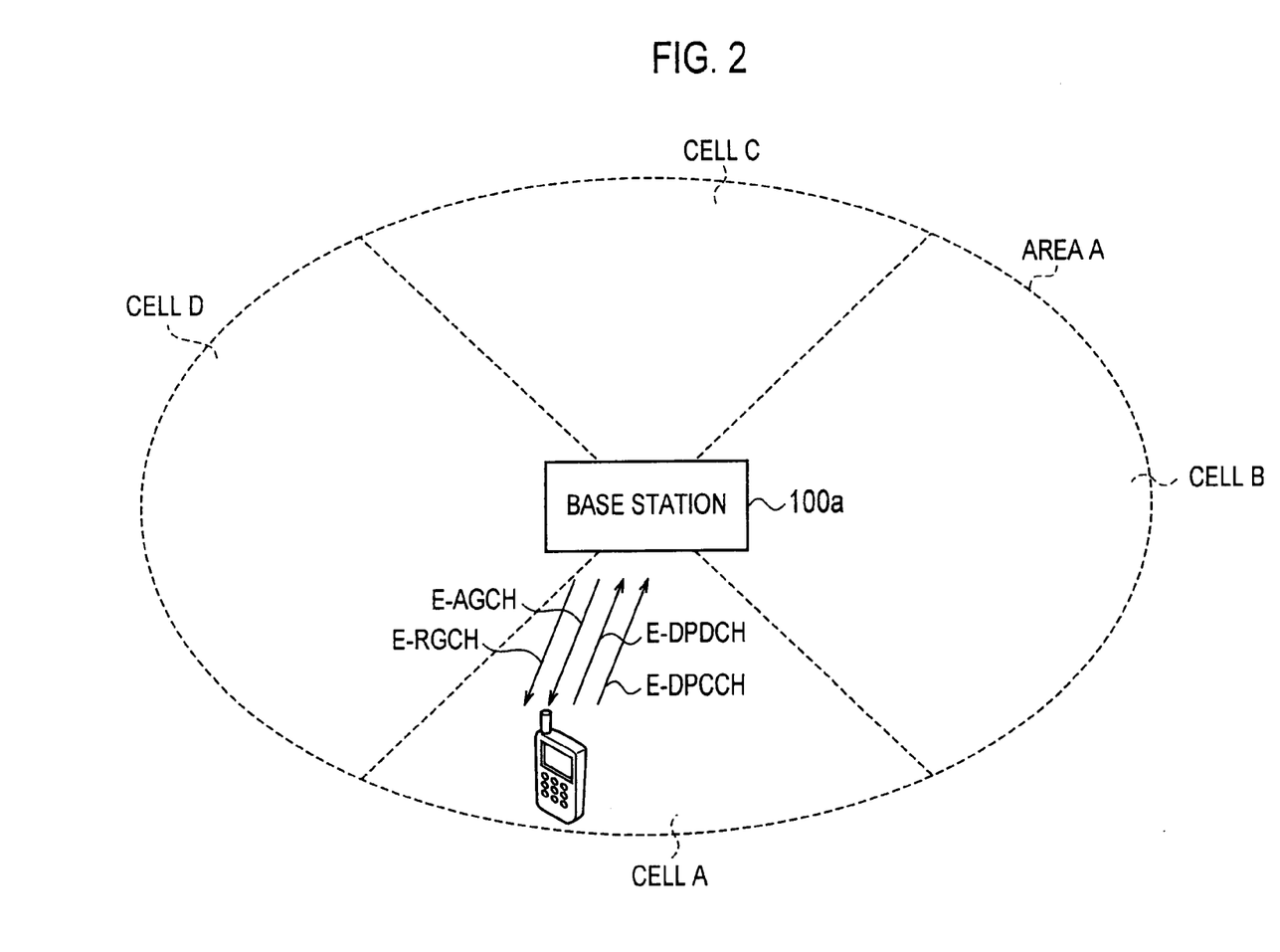
FIG. 2 is a diagram showing the radio communication system according to the first embodiment.

As shown in FIG. 2, the base station 100a has multiple cells (cells A to D) and each cell communicates with the radio terminal 10 located in the own cell. Each cell functions as a serving cell or a non-serving cell depending on the case.

It should be noted that the term "cell" is basically used to indicate a function of communicating with the radio terminal 10. In addition, note that the term "cell" is also used in some cases to indicate an area where the radio terminal 10 is located.

For example, in FIG. 2, assume a case where the radio terminal 10 performs communication according to instructions of an EUL scheduler provided in cell A (i.e., a case where the radio terminal 10 performs communication according to an AG received from cell A through an E-AGCH). In this case, cell A is a serving cell for the radio terminal 10 and cells B to D are non-serving cells for the radio terminal 10. Meanwhile, the radio terminal 10 is a serving terminal for cell A and is a non-serving terminal for any of cells B to D.

The base station 100 receives uplink data from the radio terminal 10 through a data channel such as a DPDCH or an E-DPDCH. Meanwhile, the base station 100 transmits transmission rate control data to the radio terminal 10, the transmission rate control data used to control a transmission rate of uplink data transmitted through the E-DPDCH. Note that transmission rate control data includes absolute transmission rate control data (AG; absolute grant) for directly specifying the transmission rate and relative transmission rate control data (RG; relative grant) for relatively specifying the transmission rate.

Absolute transmission rate control data (AG) is data (index) for directly specifying a transmission power ratio (E-DPDCH/DPCCH) assigned to the radio terminal 10 (refer to 3GPP TS25. 212 Ver. 7.5.0 4.10.1A.1 "Information field mapping of the Absolute Grant Value").

Thus, absolute transmission rate control data (AG) is a command for directly specifying a transmission rate value regardless of the current transmission rate.

Relative transmission rate control data (RG) is data ("up," "down" or "hold") for relatively specifying a transmission power ratio (E-DPDCH/DPCCH) assigned to the radio terminal 10 (refer to 3GPP TS25. 321 Ver. 7.5.0 9.2.5.2.1 "Relative Grants").

Thus, relative transmission rate control data (RG) is a command for relatively controlling the current transmission rate. Specifically, relative transmission rate control data (RG) includes: an increase command "up" for instructing an increase in the current transmission rate; a maintenance command "hold" for instructing maintenance of the current transmission rate; and a decrease command "down" for instructing a decrease in the current transmission rate. Note that the increase command is a command instructing an increase for a predetermined increase amount, whereas the decrease command is a command instructing a decrease for a predetermined decrease amount. The predetermined increase amount may be the same amount as the predetermined decrease amount, or may be smaller than the predetermined decrease amount.

The base station 100a transmits an AG to the radio terminal 10 through an absolute transmission rate control channel (E-AGCH; E-DCH absolute grant channel). The base station 100a transmits an RG to the radio terminal 10 through a relative transmission rate control channel (E-RGCH; E-DCH relative grant channel).

For example, a serving cell (cell A in this example) transmits an AG through an E-AGCH and an RG through an E-RGCH to the radio terminal 10. Meanwhile, a non-serving cell (cell B in this example) does not transmit an AG through an E-AGCH, but transmits an RG through an E-RGCH to the radio terminal 10.

Note that channels used for R99 (DPDCH, DPCCH and the like) are only omitted to simplify the description in FIGS. 1 and 2. Also note that there are actually many radio terminals 10 in each cell.

Note that the cell that the radio terminal 10 uses as a serving cell is not limited to one, and multiple cells may be used.

Moreover, note that in uplink data transmission based on 2 msec TTI, the transmission rate assigned to the radio terminal 10 can be controlled for each TTI according to transmission rate control data (AG or RG). In addition, uplink data transmission based on 2 msec TTI includes: transmission based on 2 msec TTI for which the base station controls radio resource allocation at each TTI (2 msec) (referred to below as 2 msec TTI/ST; scheduled transmission); and transmission based on 2 msec TTI for which the base station does not control radio resource allocation at each TTI (2 msec) (referred to below as 2 msec TTI/NST; non-scheduled transmission).

On the other hand, in uplink data transmission based on 10 msec TTI or R99, the base station does not control radio resource allocation at each TTI (2 msec). Note that in uplink data transmission based on 10 msec TTI or R99, the transmission rate assigned to the radio terminal 10 can only be controlled at an interval longer than 1 TTI.

(Configuration of Base Station)

Figure 3:
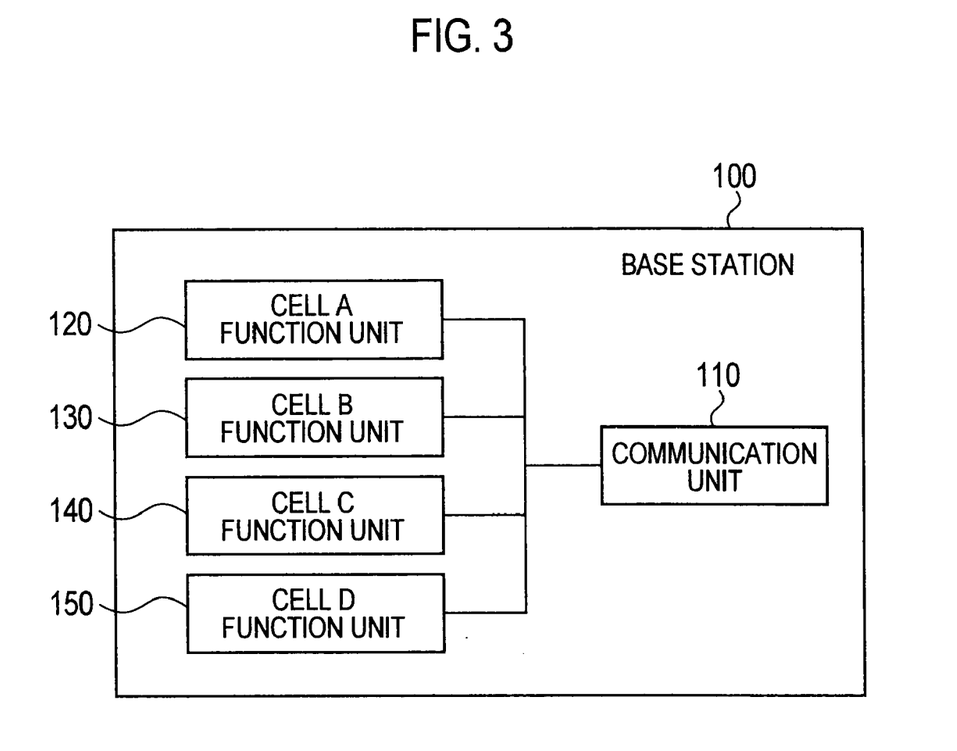
FIG. 3 is a block diagram showing a base station 100 according to the first embodiment.

Hereinafter, a configuration of the base station according to the first embodiment will be described with reference to the drawing. FIG. 3 is a block diagram showing the base station 100 according to the first embodiment.

As shown in FIG. 3, the base station 100 includes a communication unit 110, a cell A function unit 120, a cell B function unit 130, a cell C function unit 140 and a cell D function unit 150.

The communication unit 110 is configured to communicate with the radio terminals 10 in cells A to D. Specifically, the communication unit 110 receives uplink data from the radio terminal 10 through a data channel such as a DPDCH or an E-DPDCH. The communication unit 110 receives uplink control data from the radio terminal 10 through an E-DPDCH or a control channel such as a DPCCH or an E-DPCCH. Meanwhile, the communication unit 110 transmits transmission rate control data (AG or RG) to the radio terminal 10 through a control channel such as an E-AGCH or an E-RGCH.

Note that the communication unit 110 also communicates with an upper node (a radio network controller, an exchange or the like) which manages the base station 100.

The cell A function unit 120 functions as a serving cell for the radio terminal 10 located in cell A. On the other hand, the cell A function unit 120 functions as a non-serving cell for the radio terminals 10 located in cells B to D.

The cell B function unit 130 functions as a serving cell for the radio terminal 10 located in cell B. On the other hand, the cell B function unit 130 functions as a non-serving cell for the radio terminals 10 located in cells A, C and D.

The cell C function unit 140 functions as a serving cell for the radio terminal 10 located in cell C. On the other hand, the cell C function unit 140 functions as a non-serving cell for the radio terminals 10 located in cells A, B and D.

The cell D function unit 150 functions as a serving cell for the radio terminal 10 located in cell D. On the other hand, the cell D function unit 150 functions as a non-serving cell for the radio terminals 10 located in cells A to C.

(Configuration of Cell)

Figure 4:
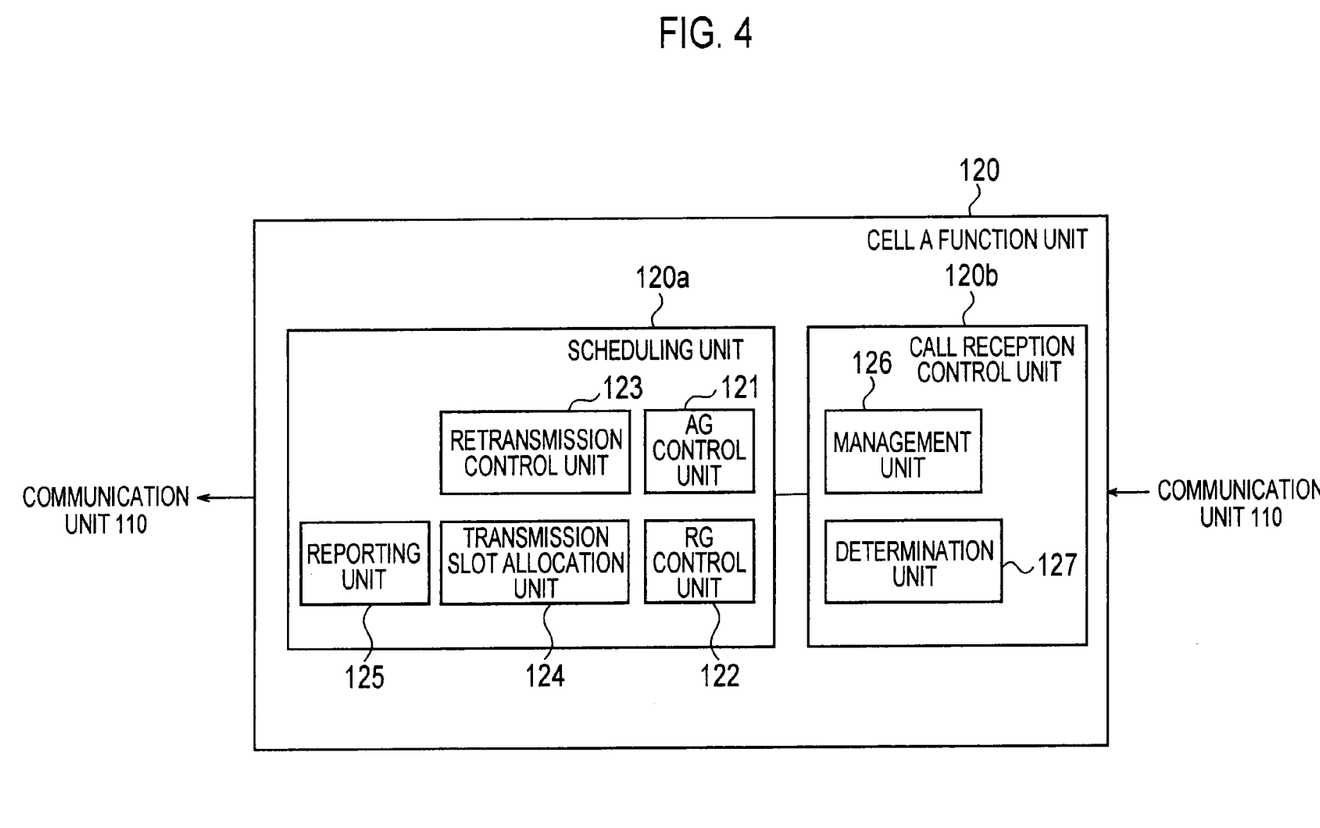
FIG. 4 is a block diagram showing a cell A function unit 120 according to the first embodiment.

Hereinafter, a configuration of the cell according to the first embodiment will be described with reference to the drawing. FIG. 4 is a block diagram showing the cell (cell A function unit 120) according to the first embodiment. Here, an example is given of a case where the cell A function unit 120 functions as a serving cell.

As shown in FIG. 4, the cell A function unit 120 includes a scheduling unit 120a and a call reception control unit 120b.

Firstly, the scheduling unit 120a allocates radio resource (transmission rate in this example) for the radio terminal 10 which uses cell A as its serving cell. To be specific, the scheduling unit 120a includes an AG control unit 121, an RG control unit 122, a retransmission control unit 123, a transmission slot allocation unit 124 and a reporting unit 125. The scheduling unit 120a operates in the MAC-e (media access control enhanced) layer.

The AG control unit 121 is configured to transmit an AG to the radio terminal 110 using cell A as its serving cell (serving terminal) through an E-AGCH. Note that an AG is a command for directly specifying a transmission rate value regardless of the current transmission rate. In uplink data transmission based on 2 msec TTI, the AG control unit 121 can transmit an AG at each TTI. Meanwhile, in uplink data transmission based on 10 msec TTI, the AG control unit 121 cannot transmit an AG at each TTI.

Here, the AG control unit 121 transmits to the radio terminal 10: an AG (Inactive) for making a request to stop use of a TTI (i.e., processes included in a cycle) assigned to the radio terminal 10; an AG (Zero Grant) for specifying "0" as the transmission rate to be assigned to the radio terminal 10; an AG for specifying a guaranteed minimum transmission rate as an allocated transmission rate; and the like. Note that the guaranteed minimum transmission rate is the minimum transmission rate that should be guaranteed for the radio terminal 10.

The RG control unit 122 is configured to transmit an RG through an E-RGCH to the radio terminal 10 using cell A as its serving cell (serving terminal) or the radio terminal 10 not using cell A as its serving cell (non-serving terminal). Note that an RG is any of an increase command "up," a maintenance command "hold" and a decrease command "down." As has been described, the increase command "up" is a command instructing an increase for a predetermined increase amount, whereas the decrease command "down" is a command instructing a decrease for a predetermined decrease amount. In uplink data transmission based on 2 msec TTI/ST, the RG control unit 122 can transmit an RG at each TTI. Meanwhile, in uplink data transmission based on 10 msec TTI, the RG control unit 122 cannot transmit an RG at each TTI.

Note that the AG control unit 121 and the RG control unit 122 refer to uplink control data such as scheduling information received from the radio terminal 10, and thereby control the SG to assign to the radio terminal 10.

The retransmission control unit 123 is configured to determine, for each block (process), whether or not an error occurs in uplink data. Subsequently, the retransmission control unit 123 requests retransmission of a block including an error (referred to below as an error block) to the radio terminal 10. The retransmission control technique used at this time is HARQ (hybrid automatic repeat request) in which a block initially transmitted by the radio terminal 10 (referred to below as a transmission block) and a block retransmitted by the radio terminal 10 (referred to below as a retransmission block) are combined.

The transmission slot allocation unit 124 is configured to allocate, to the radio terminal 10, a transmission slot (i.e., processes included in a cycle) to be used for receiving uplink data (block) which is transmitted through an E-DPDCH. Note that the radio terminal 10 transmits a transmission block or a retransmission block to the base station 100 by use of a process (active process) allocated by the transmission slot allocation unit 124.

The reporting unit 125 is configured to report, at predetermined intervals to the call reception control unit 120b, a total resource allocation amount of radio resource allocated for uplink data reception. The interval for reporting the total resource allocation amount of radio resource is at least longer than the length of TTI based on 2 msec. The interval at which the total resource allocation amount of radio resource is reported is indicated by a parameter set in advance by the base station 100, for example.

Here, the total resource allocation amount is the total amount of radio resource allocated to all of the radio terminals 10 managed by a later-mentioned management unit 126. For example, in a case where the management unit 126 manages both the radio terminal 10 according to R99 and the radio terminal 10 according to EUL, the total resource allocation amount is the total of the sum of amounts of radio resource allocated to the radio terminals 10 according to R99 and the sum of amounts of radio resource allocated to the radio terminals according to EUL. Meanwhile, in a case where the management unit 126 manages only the radio terminal 10 according to EUL, the total resource allocation amount is the sum of amounts of radio resource allocated to the radio terminals 10 according to EUL. Thus, radio resource is hardware resource needed for signal processing of the base station 100 (or the cell).

Note that the later-mentioned management unit 126 may manage the radio terminal 10 belonging to a single cell or the radio terminal 10 belonging to multiple cells provided to the base station 100.

Secondly, the call reception control unit 120b controls reception of calls for the radio terminal 10 using cell A as its serving cell. To be specific, the call reception control unit 120b includes the management unit 126 and a determination unit 127.

The management unit 126 is configured to manage the total resource usage amount of radio resource used for reception of uplink data, by updating the total resource usage amount of radio resource used for reception of uplink data on the basis of the total resource allocation amount reported by the scheduling unit 120a. That is, the management unit 126 updates the total resource usage amount at predetermined intervals.

For example, the management unit 126 minimizes the total resource allocation amount reported by the scheduling unit 120a on the assumption that the scheduling unit 120a operates ideally. The management unit 126 updates the total resource usage amount on the basis of the minimized total resource allocation amount.

When reception of a new call is permitted, the management unit 126 updates the total resource usage amount by adding radio resource to be allocated to the new call (initial radio resource). For example, the management unit 126 adds the minimum radio resource to be allocated to a new call to the total resource usage amount.

Here, the minimum radio resource is the guaranteed minimum transmission rate for receiving data, which is equivalent to Minimum Set E-TFCI (enhanced transport format combination), for example. Note that the guaranteed minimum transmission rate may be the minimum transmission rate determined in accordance with Minimum Set E-TFCI and a target reception quality of the system.

Moreover, the minimum radio resource may be the guaranteed minimum transmission rate, which is equivalent to MAC-es Guaranteed Bit Rate. Note that the minimum radio resource may be the minimum resource which can achieve both a target reception quality of the system and the guaranteed minimum transmission rate, which is equivalent to MAC-es Guaranteed Bit Rate.

When an existing call based on 10 msec TTI is released, the management unit 126 updates the total resource usage amount by subtracting the radio resource allocated to the existing call based on 10 msec TTI. For example, the management unit 126 subtracts the minimum radio resource to be allocated to an existing call based on 10 msec TTI from the total resource usage amount.

Note that the minimum radio resource is the guaranteed minimum transmission rate, which is equivalent to MAC-es Guaranteed Bit Rate, for example. Moreover, the minimum radio resource may be the guaranteed minimum transmission rate for receiving data, which is equivalent to Minimum Set E-TFCI based on 10 msec TTI.

When an existing call based on 2 msec TTI/ST is released, the management unit 126 manages the total resource usage amount without subtracting the radio resource allocated to the existing call based on 2 msec TTI/ST. For example, the management unit 126 keeps the total resource usage amount without updating it even when an existing call based on 2 msec TTI/ST is released.

The determination unit 127 is configured to determine whether or not reception of a new call is permissible, on the assumption that radio resource to be allocated to a new call (initial radio resource) is added to the total resource amount managed by the management unit 126. Specifically, the determination unit 127 calculates a determination usage amount by adding the initial radio resource to the total resource usage amount. If the determination usage amount exceeds a determination threshold, the determination unit 127 determines that the new call cannot be received. That is, reception of the new call is rejected. On the other hand, if the determination usage amount does not exceed the determination threshold, the determination unit 127 determines that the new call can be received. That is, reception of the new call is permitted.

Here, in determining whether or not to permit reception of a new call based on 2 msec TTI/ST, the determination unit 127 may adjust the determination threshold by using an offset. The determination unit 127 compares the determination usage amount with the determination threshold adjusted by using an offset.

Note that an offset is a value that increases the determination threshold. In other words, by adjusting the determination threshold by using an offset, reception of a new call based on 2 msec TTI/ST is more likely to be permitted. For example, an offset may be a ratio m (1<m). In this case, the determination unit 127 multiplies the determination threshold by the offset. Otherwise, the offset may be a predetermined value n (0<n). In this case, the determination unit 127 adds the offset to the determination threshold.

(Calculation of Total Resource Usage Amount)

Figure 5A:
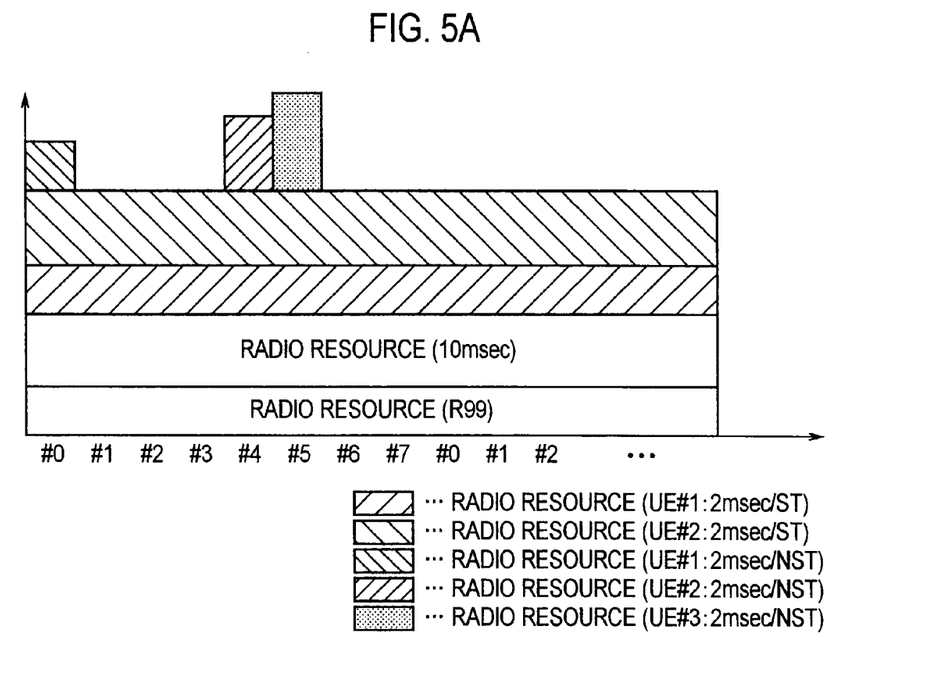
FIGS. 5A and 5B are diagrams for explaining how to calculate a total resource usage amount according to the first embodiment.
Figure 5B:
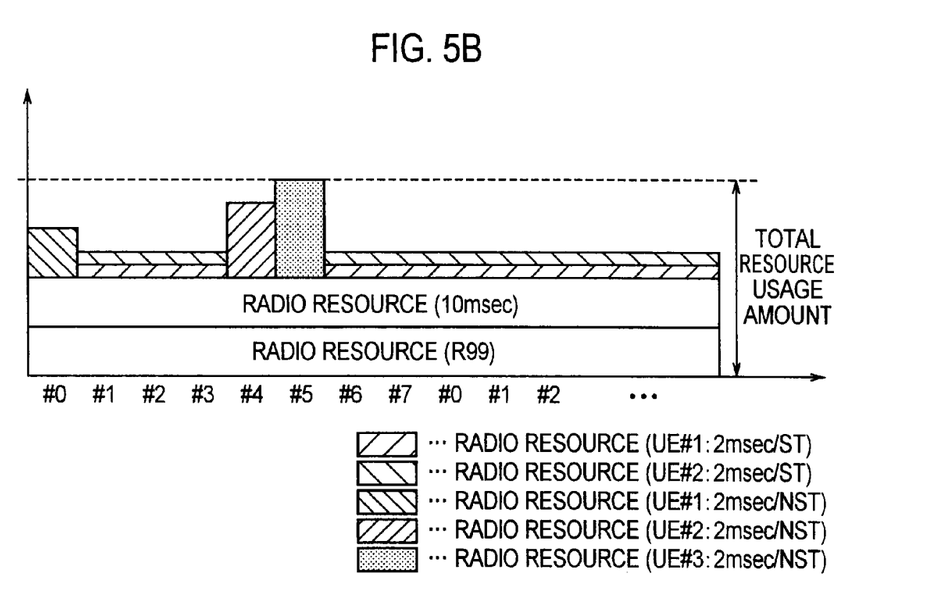

Hereinafter, calculation of the total resource usage amount according to the first embodiment will be described with reference to the drawings. FIGS. 5A and 5B are diagrams for describing calculation of the total resource usage amount according to the first embodiment. FIG. 5A is a diagram showing the total resource allocation amount. FIG. 5B is a diagram showing the total resource usage amount. Here, exemplified is a case where the management unit 126 manages both the radio terminal 10 according to R99 and the radio terminal 10 according to EUL.

As shown in FIG. 5A, the total resource allocation amount of radio resource includes Radio resource (R99), Radio resource (10 msec), Radio resource (2 msec/ST) and Radio resource (2 msec/NST).

Radio resource (R99) is radio resource allocated for reception of uplink data according to R99. Radio resource (R99) is not targeted for control by the scheduling unit 120a, and an instruction from the radio network controller 200 is required to change the resource allocation amount of Radio resource (R99). Accordingly, the call reception control unit 120b (management unit 126) is aware of the resource usage amount of Radio resource (R99). In addition, radio resource allocation at each TTI (time sharing) is not set for Radio resource (R99), and thus the resource usage amount does not change at each 2 msec TTI (HARQ process).

Radio resource (10 msec) is radio resource allocated for reception of uplink data based on 10 msec TTI. Although Radio resource (10 msec) is targeted for control by the scheduling unit 120a, the guaranteed minimum transmission rate of Radio resource (10 msec) is reported by the radio network controller 200. Accordingly, the call reception control unit 120b (management unit 126) already knows the guaranteed minimum transmission rate of Radio resource (10 msec), as well as of the resource usage amount of Radio resource (10 msec). In addition, radio resource allocation at each TTI (time sharing) is not set for Radio resource (10 msec), and thus the resource usage amount does not change at each 2 msec TTI (HARQ process).

Radio resource (2 msec/ST; scheduled transmission) is radio resource allocated for reception of uplink data based on 2 msec TTI. Radio resource (2 msec/ST) is targeted for control by the scheduling unit 120a, and thus radio resource is allocated by the scheduling unit 120a at each TTI (time sharing). Accordingly, the resource usage amount of Radio resource (2 msec/ST) changes at each 2 msec TTI (HARQ process). Moreover, if UL Target SIR is also controlled by the scheduling unit 120a, the call reception control unit 120b (management unit 126) cannot associate the guaranteed minimum transmission rate reported by the radio network controller 200 with the minimum resource usage amount.

Radio resource (2 msec/NST; non-scheduled transmission) is radio resource allocated for reception of uplink data based on 2 msec TTI. Radio resource (2 msec/NST) is not targeted for control by the scheduling unit 120a, and is controlled by transmission rate information forwarded from the radio network controller 200. Accordingly, the call reception control unit 120b (management unit 126) already knows the resource usage amount of Radio resource (2 msec/NST). In addition, radio resource allocation at each TTI (time sharing) is not set for Radio resource (2 msec/NST), and thus the resource usage amount does not change at each 2 msec TTI (HARQ process).

As shown in FIG. 5B, the total resource usage amount includes Radio resource (R99), Radio resource (10 msec), Radio resource (2 msec/ST) and Radio resource (2 msec/NST).

Radio resource (R99) is unchanged and is kept in the same state as in FIG. 5A.

Radio resource (10 msec) is minimized on the assumption that the minimum radio resource will be secured. The minimum radio resource is the guaranteed minimum transmission rate, which is equivalent to MAC-es Guaranteed Bit Rate, for example. Otherwise, the minimum radio resource may be the guaranteed minimum transmission rate for receiving data, which is equivalent to Minimum Set E-TFCI based on 10 msec TTI.

Radio resource (2 msec/ST) and Radio resource (2 msec/NST) are minimized on the assumption that the minimum radio resource will be secured. The minimum radio resource is the guaranteed minimum transmission rate, which is equivalent to MAC-es Guaranteed Bit Rate, for example. Otherwise, the minimum radio resource may be the guaranteed minimum transmission rate for receiving data, which is equivalent to Minimum Set E-TFCI based on 10 msec TTI.

Note that shortage in the radio resource (reception resource) for reception of uplink data should preferably be avoided also for a UE whose SG is "Zero Grant" when recovering from "Zero Grant." Accordingly, a radio resource amount necessary for achieving the guaranteed minimum transmission rate in a target value of Outer Loop TPC (transmission power control) may be accumulated in the total resource usage amount.

Here, assume a case where a data amount equivalent to Minimum Set E-TFCI is larger than the maximum MAC-e PDU (protocol data unit) for Radio resource (2 msec/NST). In this case, Radio resource (2 msec/ST) for a certain user is minimized on the assumption that Radio resource (2 msec/ST) for a certain user is allocated to the same process as is Radio resource (2 msec/NST).

(Operation of Base Station (Cell))

Figure 6:
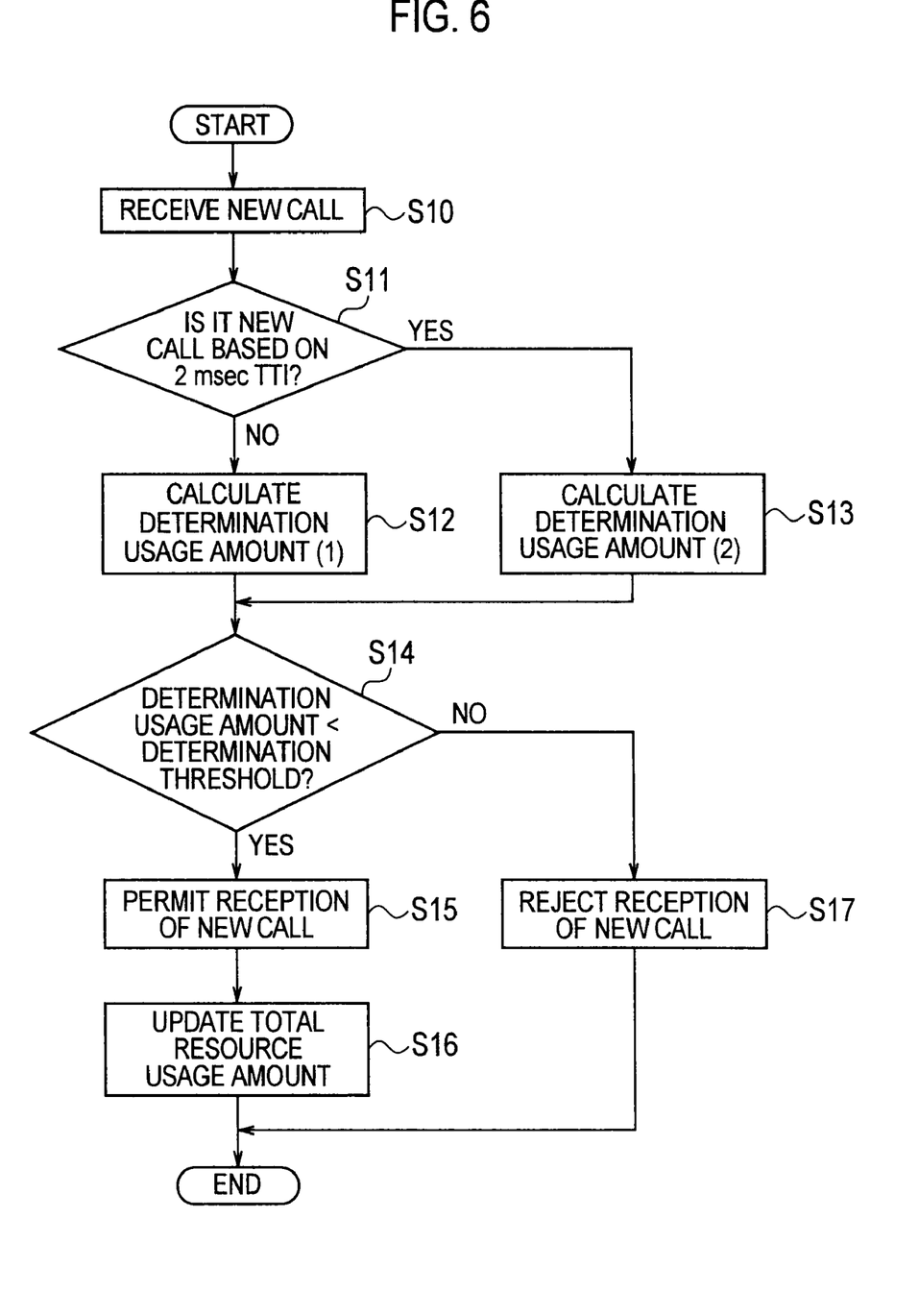
FIG. 6 is a flowchart showing an operation of the base station 100 (cell) according to the first embodiment.

Hereinafter, an operation of the base station (cell) according to the first embodiment will be described with reference to the drawings. FIG. 6 is a flowchart showing an operation of the radio base station 100 (cell) according to the first embodiment. Here, an operation of the call reception control unit 120b will mainly be described.

Firstly, processing performed by the call reception control unit 120b for receiving a new call will be described with reference to FIG. 6.

Here, the call reception control unit 120b receives reports on the total resource allocation amount at predetermined intervals from the scheduling unit 120a. The call reception control unit 120b manages the total resource usage amount by updating the total resource usage amount on the basis of the total resource allocation amount reported by the scheduling unit 120a.

As shown in FIG. 6, in step 10, the call reception control unit 120b receives a new call.

In step 11, the call reception control unit 120b determines whether or not the new call received in step 10 is a new call based on 2 msec TTI/ST. Upon receipt of a new call based on 2 msec TTI/ST, the call reception control unit 120b proceeds to the processing of step 13. Upon receipt of a new call based on 10 msec TTI, the call reception control unit 120b proceeds to the processing of step 12.

In step 12, the call reception control unit 120b calculates the determination usage amount by adding, to the total resource usage amount, radio resource to be allocated to the new call (initial radio resource) based on 10 msec TTI.

In step 13, the call reception control unit 120b calculates the determination usage amount by adding, to the total resource usage amount, radio resource to be allocated to the new call (initial radio resource) based on 2 msec TTI/ST. Moreover, the call reception control unit 120b adjusts the determination threshold by using an offset.

In step 14, the call reception control unit 120b determines whether or not the determination usage amount exceeds the determination threshold. If the determination usage amount does not exceed the determination threshold, the call reception control unit 120b proceeds to the processing of step 15. If the determination usage amount exceeds the determination threshold, the call reception control unit 120b proceeds to the processing of step 17.

In step 15, the call reception control unit 120b permits reception of the new call.

In step 16, the call reception control unit 120b updates the total resource usage amount by adding radio resource to be allocated to the new call (initial radio resource).

In step 17, the call reception control unit 120b rejects reception of the new call.

Secondly, processing performed by the call reception control unit 120b for releasing an existing call will be described with reference to FIG. 7.

Figure 7:
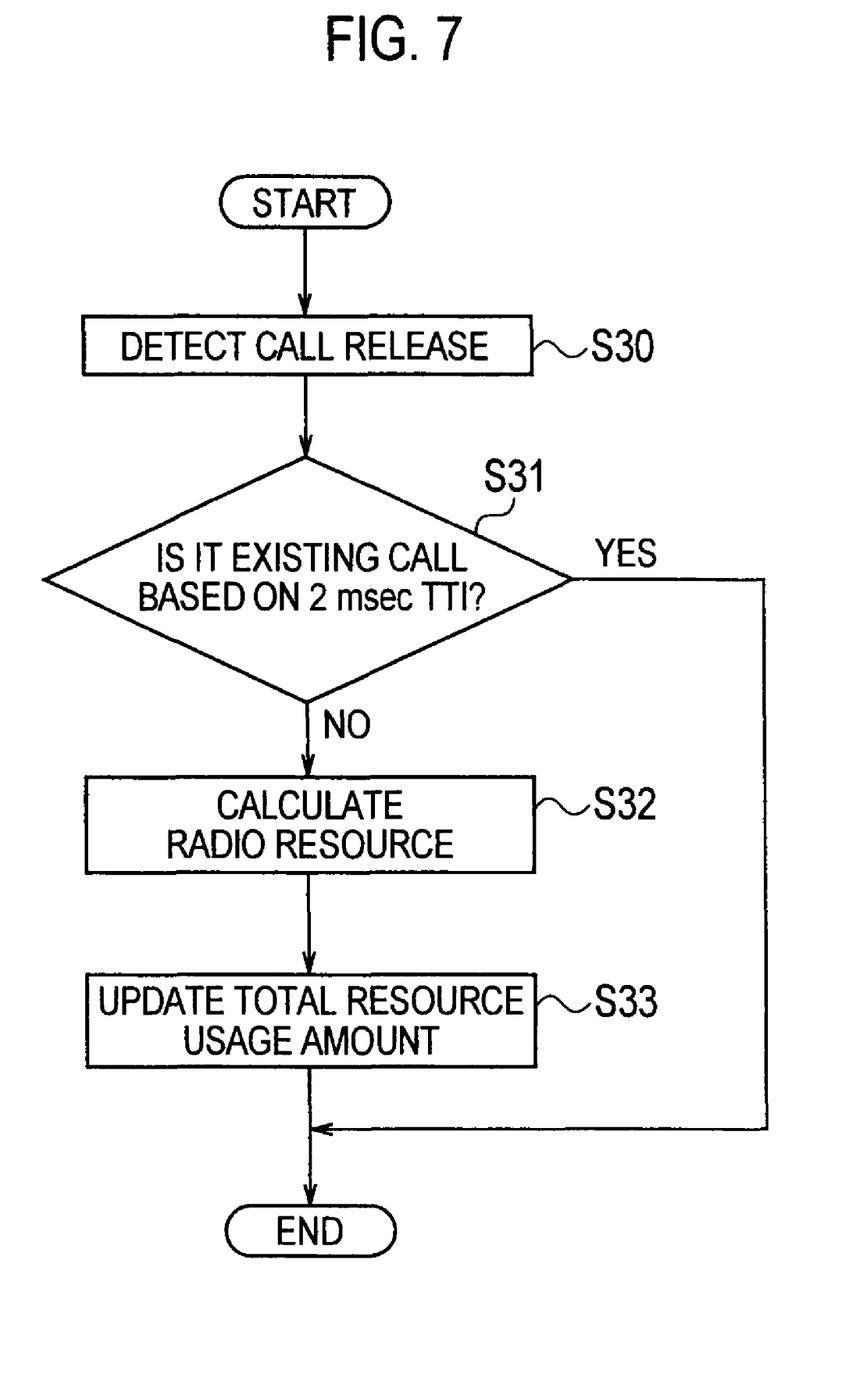
FIG. 7 is a flowchart showing an operation of the base station 100 (cell) according to the first embodiment.

As shown in FIG. 7, in step 30, the call reception control unit 120b detects release of an existing call.

In step 31, the call reception control unit 120b determines whether or not the existing call detected in step 30 is an existing call based on 2 msec TTI/ST. If an existing call based on 2 msec TTI/ST is released, the call reception control unit 120b terminates the series of processing. That is, the call reception control unit 120b keeps the total resource usage amount without updating it. If an existing call based on 10 msec TTI is released, the call reception control unit 120b proceeds to the processing of step 32.

In step 32, the call reception control unit 120b calculates the radio resource allocated to the existing call based on 10 msec TTI. For example, the call reception control unit 120b calculates the minimum radio resource to be allocated to an existing call based on 10 msec TTI.

In step 33, the call reception control unit 120b updates the total resource usage amount by subtracting the radio resource calculated in step 32. For example, the call reception control unit 120b subtracts the minimum radio resource to be allocated to an existing call based on 10 msec TTI from the total resource usage amount.

(Operation and Effects)

In the first embodiment, the call reception control unit 120b acquires the total resource allocation amount at predetermined intervals, and manages the total resource usage amount on the basis of the total resource allocation amount. The call reception control unit 120b adds radio resource to be allocated to a new call (initial radio resource) and thereby determines whether or not reception of the new call is permissible.

For this reason, the call reception control unit 120b does not need to make an inquiry to the scheduling unit 120a about the radio resource allocated for reception of uplink data every time a new call is received. In other words, the call reception control unit 120b can promptly determine whether or not reception of a new call is permissible. In addition, by managing the total resource usage amount, the call reception control unit 120b can promptly determine whether or not reception of a new call is permissible.

In the first embodiment, in response to release of an existing call based on 10 msec TTI, the call reception control unit 120b updates the total resource usage amount by subtracting the radio resource allocated to the existing call based on 10 msec TTI. Meanwhile, even when an existing call based on 2 msec TTI/ST is released, the call reception control unit 120b manages the total resource usage amount without subtracting the radio resource allocated to the existing call based on 2 msec TTI/ST.

Here, radio resource is controlled for each TTI (HARQ process) in transmission of uplink data based on 2 msec TTI/ST. Accordingly, even if an existing call based on 2 msec TTI/ST is released in a TTI, the radio resource may be used in another TTI. In such a case, use of the above configuration can avoid shortage of radio resource to be used for reception of uplink data.

In the first embodiment, the call reception control unit 120b manages the minimized amount of radio resource to be used for reception of uplink data as the total resource usage amount. Accordingly, if the scheduling unit 120a operates ideally, it is possible to avoid a case of rejecting reception of a new call even though reception of the new call is permissible.

In the first embodiment, the call reception control unit 120b adjusts the determination threshold by using an offset in determining whether or not to permit reception of a new call based on 2 msec TTI/ST.

Here, radio resource is controlled for each TTI (HARQ process) in transmission of uplink data based on 2 msec TTI/ST. Accordingly, there is a possibility that not all of initial radio resource is used. In such a case, use of the above configuration can suppress rejection of reception of new calls due to overestimate of the amount of initial radio resource to be allocated to a specific new call.

[Other Embodiments]

The present invention has been described by using the above embodiment of the present invention. However, it should not be understood that the description and drawings which constitute part of this disclosure limit the present invention. From this disclosure, various alternative embodiments, examples, and operation techniques will be easily found by those skilled in the art.

In the embodiment, the call reception control unit 120b calculates the total resource usage amount i.e., minimizes the radio resource. However, the embodiment is not limited to this. The total resource usage amount may be calculated by the scheduling unit 120a. In this case, the call reception control unit 120b acquires the total resource usage amount from the scheduling unit 120a at predetermined intervals.

Although EUL (enhanced uplink) has been exemplified, the embodiment is not limited to this. The embodiment is applicable to communication in which the scheduling unit 120a and the call reception control unit 120b operate independently. For example, the scheduling unit 120a may be provided in the base station 100 and the call reception control unit 120b may be provided in an upper node such as the radio network controller 200.

In the embodiment, 2 msec TTI/ST (scheduled transmission) has been shown as a mere example of transmission in which the scheduling unit 120a controls radio resource allocation at each TTI. Accordingly, the TTI of uplink data is not limited to 2 msec or 10 msec, as a matter of course.

[Industrial Applicability]

According to the present invention, provided is a base station, an upper node, a radio communication system and a radio communication method which enable appropriate and prompt control of reception of new calls.

The invention claimed is:

1. A base station comprising:
   a scheduling unit configured to allocate a radio resource to be used for reception of uplink data; and
   a call reception control unit configured to control reception of a call, wherein:
   the scheduling unit includes a reporting unit configured to report a total resource allocation amount of the radio resource to the call reception control unit at predetermined intervals, the radio resource being allocated by the scheduling unit;
   the call reception control unit includes
     a management unit configured to manage a total resource usage amount of the radio resource used for reception of uplink data by updating the total resource usage amount of the radio resource used for reception of uplink data on the basis of the total resource allocation amount reported by the scheduling unit, and
     a determination unit configured to determine whether or not reception of a new call is permissible by adding an initial radio resource to be allocated to the new call to the total resource usage amount managed by the management unit;
   in response to release of an existing call for which the scheduling unit does not perform radio resource allocation at each transmission time interval, the management unit updates the total resource usage amount by subtracting the radio resource allocated to the existing call for which the scheduling unit does not perform the radio resource allocation at each transmission time interval; and
   in response to release of an existing call for which the scheduling unit performs radio resource allocation at each transmission time interval, the management unit manages the total resource usage amount without subtracting the radio resource allocated to the existing call for which the scheduling unit performs the radio resource allocation at each transmission time interval.

2. The base station according to claim 1, wherein the management unit updates the total resource usage amount on the basis of a minimum total resource allocation amount reported by the scheduling unit.

3. The base station according to claim 1, wherein the determination unit adjusts a determination condition by using an offset, the determination condition being used to determine whether or not to receive a new call for which the scheduling unit performs radio resource allocation at each transmission time interval.

4. An upper node receiving reports on a total resource allocation amount of a radio resource from a base station at predetermined intervals, the radio resource being allocated by the base station configured to allocate the radio resource to be used for reception of uplink data, the upper node comprising:

a management unit configured to manage a total resource usage amount of the radio resource used for reception of uplink data by updating the total resource usage amount of the radio resource used for reception of uplink data on the basis of the total resource allocation amount reported by the base station; and a determination unit configured to determine whether or not reception of a new call is permissible by adding an initial radio resource to be allocated to the new call to the total resource usage amount managed by the management unit, wherein:

in response to release of an existing call for which the base station does not perform radio resource allocation at each transmission time interval, the management unit updates the total resource usage amount by subtracting the radio resource allocated to the existing call for which the base station does not perform the radio resource allocation at each transmission time interval; and in response to release of an existing call for which the base station performs radio resource allocation at each transmission time interval, the management unit manages the total resource usage amount without subtracting the radio resource allocated to the existing call for which the base station performs the radio resource allocation at each transmission time interval.

5. A radio communication system comprising a scheduling unit configured to allocate a radio resource to be used for reception of uplink data, and a call reception control unit configured to control reception of a call, wherein:

the scheduling unit includes a reporting unit configured to report a total resource allocation amount of the radio resource to the call reception control unit at predetermined intervals, the radio resource being allocated by the scheduling unit;

the call reception control unit includes a management unit configured to manage a total resource usage amount of the radio resource used for reception of uplink data by updating the total resource usage amount of the radio resource used for reception of uplink data on the basis of the total resource allocation amount reported by the scheduling unit, and a determination unit configured to determine whether or not reception of a new call is permissible by adding an initial radio resource to be allocated to the new call to the total resource usage amount managed by the management unit;

in response to release of an existing call for which the scheduling unit does not perform radio resource allocation at each transmission time interval, the management unit updates the total resource usage amount by subtracting the radio resource allocated to the existing call for which the scheduling unit does not perform the radio resource allocation at each transmission time interval; and in response to release of an existing call for which the scheduling unit performs radio resource allocation at each transmission time interval, the management unit manages the total resource usage amount without subtracting the radio resource allocated to the existing call for which the scheduling unit performs the radio resource allocation at each transmission time interval.

6. A radio communication method comprising:

a step A of allocating a radio resource to be used for reception of uplink data;

a step B of reporting at predetermined intervals a total resource allocation amount of the radio resource allocated in the step A;

a step C of managing a total resource usage amount of the radio resource used for reception of uplink data by updating the total resource usage amount of the radio resource used for reception of uplink data on the basis of the total resource allocation amount reported in the step B, and a step D of determining whether or not reception of a new call is permissible by adding an initial radio resource to be allocated to the new call to the total resource usage amount managed in the step C;

a step E of, in response to release of an existing call for which radio resource allocation is performed at each transmission time interval, updating the total resource usage amount by subtracting the radio resource allocated to the existing call for which the radio resource allocation is not performed at each transmission time interval; and a step F of, in response to release of an existing call for which radio resource allocation is performed at each transmission time interval, managing the total resource usage amount without subtracting the radio resource allocated to the existing call for which the radio resource allocation is not performed at each transmission time interval.

* * * * *